No. 783,473. PATENTED FEB. 28, 1905.
F. P. SMITH.
APPARATUS FOR EVAPORATING AND BURNING REFUSE MATTER.
APPLICATION FILED OCT. 30, 1902.

WITNESSES:
Donn Twitchell
Harold T. Lyman

INVENTOR
Fred P. Smith
BY
Benjamin Price
ATTORNEY

No. 783,473.

Patented February 28, 1905.

UNITED STATES PATENT OFFICE.

FRED P. SMITH, OF NEW YORK, N. Y., ASSIGNOR TO THE MUNICIPAL ENGINEERING COMPANY, OF NEW YORK, N. Y., A CORPORATION OF DELAWARE.

APPARATUS FOR EVAPORATING AND BURNING REFUSE MATTER.

SPECIFICATION forming part of Letters Patent No. 783,473, dated February 28, 1905.

Application filed October 30, 1902. Serial No. 129,365.

*To all whom it may concern:*

Be it known that I, FRED P. SMITH, a citizen of the United States, and a resident of the city, county, and State of New York, have invented certain new and useful Improvements in Apparatus for Evaporating and Burning Refuse Matter, of which the following is a full description.

In this invention I have constructed a furnace-cell having a fire-grate at each end with the refuse-receptacle between them; and its object is to provide efficient means for first slowly drying a charge of refuse matter and then rapidly consuming it by the heat from the fires.

The drawings accompanying this application illustrate the invention, of which—

Figure 1:
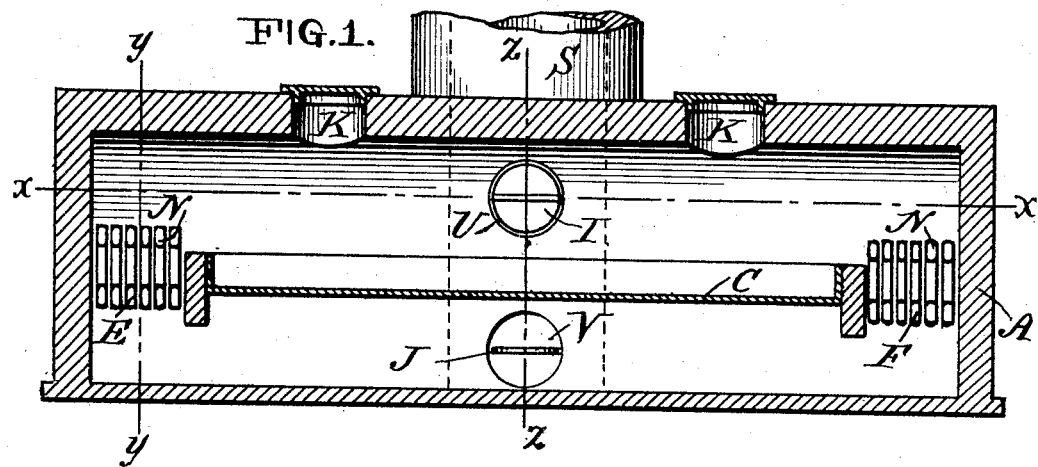
Figure 2:
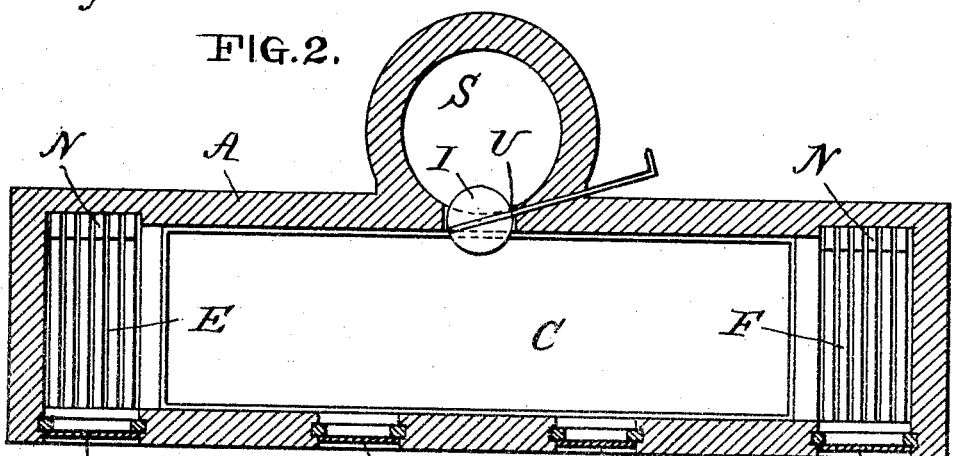
Figure 3:
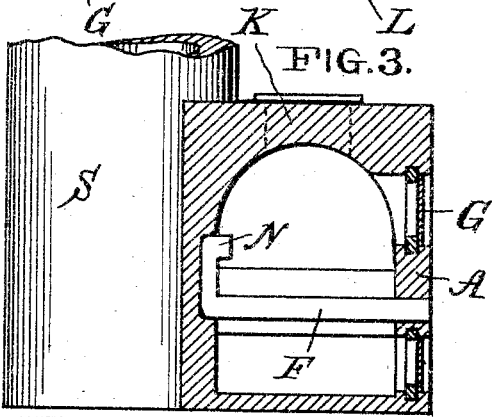
Figure 4:
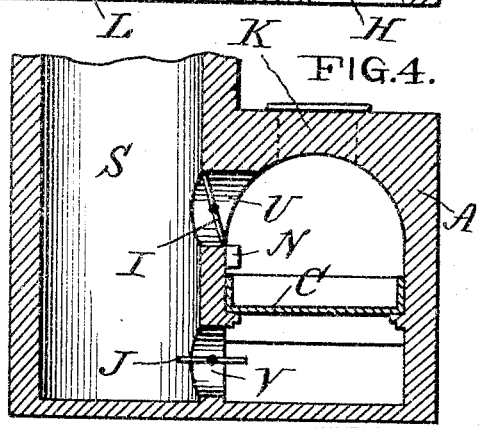

Figure 1 is a longitudinal section of the apparatus; Fig. 2, a plan view of the same on line X X of Fig. 1; Fig. 3, a vertical section taken on line Y Y of Fig. 1; Fig. 4, a vertical section taken on line Z Z of Fig. 1.

The furnace is constructed with walls A of brick or other suitable material as usual in such structures and may be of any form—as oblong, circular, semicircular, or a parallelogram—the interior of which I shall call a "cell," and within the cell I have erected the devices by means of which the operations are performed to effect the objects required. The cell is divided horizontally by a partition or floor C. This floor is preferably made of iron or steel, and its purpose is that of a support for the garbage or other wet matter and to retain it in position to be evaporated and dried by the heat passing under the floor or to be burned by the heat directed through it in its course to the chimney. At each end of the cell are placed the grates E and F and below them the usual ash-pit provided with the doors G and H. The floor C divides the cell into an upper and lower duct or flue for the draft in its course to the chimney, and both of them are provided with openings to said chimney, (the upper one marked U and the lower one V.) They are arranged to be opened or closed at pleasure by the dampers I and J. S is the chimney to which these openings lead. The openings K are arranged above the floor C for the purpose of dumping the refuse matter thereon and the openings L to facilitate moving or stirring the matter when required. This arrangement of the parts enables an operator to produce the desired results by an intelligent manipulation of the several dampers and doors as the work of drying and consuming proceeds.

Having a fire at both ends of the cell and a duct above and below the floor, each of them leading to a chimney and effectually controlled by the dampers, the operator may begin with the floor C, charged with the refuse matter to be dried and consumed. If this matter is already dry enough, he will light his fires on both grates E and F and close the lower damper J and the opening V. The flame from both fires is thus directed to the chimney through the refuse matter and the upper opening U. The grates may be constructed of hollow grate-bars, as shown at N, through which the air from without is transmitted and becoming heated in its passage therethrough furnishes an abundant supply of hot air for combustion, causing intense heat and rapidly consuming the material from both ends. If the material is too wet to begin by burning it direct, the construction of this apparatus affords ample and effectual means for drying it before burning. In such case the operator will close the upper damper I, leaving the lower one, J, open. This creates a downdraft, passing under the floor C, imparting heat thereto and evaporating and drying the wet material supported thereon, while at the same time the vapors and noxious gases thrown off during the process of drying are also drawn through the fires on the grates, consumed thereby, and passed out under the floor C to the chimney. I have found also in my experience that it is very difficult to prevent the escape of bad odors if the material be charred or scorched in the process of drying, and the arrangement of the devices herein described enables me to prevent this by using the ash-pit doors G and H to allow the entrance of cooler air into the duct to temper the heat beneath the floor C, and thereby prevent the scorching of the material which it supports. When the material is thus properly dried and ready for burning, the lower damper in the opening to the chimney is closed and the upper one opened, thereby exposing and subjecting the material to the intense heat from both of the fires and is thus rapidly consumed.

It will be seen from the above that this construction of furnace answers the purposes of slowly drying and rapidly consuming refuse matter, while at the same time the vapors from this matter are drawn off and consumed the operator is thereby enabled to prevent the scorching of the matter in the process of evaporating and preparing it for burning.

What I claim, and desire to secure by Letters Patent, is—

1. In an apparatus for evaporating and burning refuse matter, a furnace having a floor to support refuse matter, an upper and lower compartment separated by the floor, in combination with a grate located at each end of the floor and means for directing the products of combustion from both grates below the floor to dry the matter thereon or through the compartment above the floor to consume it.

2. In an apparatus for evaporating and burning refuse matter a furnace provided with a floor to support refuse matter, an upper and lower compartment separated by the floor, and a fire-grate located at each end of the floor in combination with a chimney situated between the ends of the receptacle for refuse matter, and devices to direct the products of combustion from either of the grates above or below the floor in its passage to the chimney.

In testimony whereof I, the said FRED P. SMITH, have signed my name to this specification, in the presence of two subscribing witnesses, this 4th day of September, 1902.

FRED P. SMITH.

Witnesses:
M. TURNER,
HAROLD T. LYMAN.